United States Patent [19]

LaBudde et al.

[11] 4,451,915
[45] May 29, 1984

[54] OPTICAL STORAGE SYSTEM EMPLOYING A MULTI-LAYER OPTICAL MEDIUM

[75] Inventors: Edward V. LaBudde, Newbury Park; Miguel A. Capote, Westlake Village; Shiuh Chao, Hawthorne; Neville K. S. Lee, Thousand Oaks, all of Calif.

[73] Assignee: Burroughs Corporation, Detroit, Mich.

[21] Appl. No.: 368,667

[22] Filed: Apr. 15, 1982

[51] Int. Cl.³ ............................................. G11B 7/24
[52] U.S. Cl. .................. 369/109; 346/76 L; 346/135.1; 369/111; 369/275; 369/288; 369/286
[58] Field of Search ............... 365/106, 109, 112, 113, 365/124, 127, 215; 369/100, 111, 275, 286, 288, 109; 346/1.1, 76 L, 135.1; 430/348, 496, 945, 495; 427/255.6, 41, 398.4

[56] References Cited

U.S. PATENT DOCUMENTS

| | | | |
|---|---|---|---|
| 3,069,283 | 12/1962 | Coleman | 427/41 |
| 3,389,012 | 6/1968 | Hamm | 427/41 |
| 3,700,489 | 10/1972 | Borysko | 427/255.6 |
| 4,216,501 | 8/1980 | Bell | 346/135.1 |
| 4,222,071 | 9/1980 | Bell | 346/76 L |
| 4,232,337 | 11/1980 | Winslow | 369/44 |
| 4,243,848 | 1/1981 | Utsumi | 369/45 |
| 4,243,850 | 1/1981 | Edwards | 369/46 |
| 4,253,019 | 2/1981 | Opheij | 250/201 |
| 4,253,734 | 3/1981 | Kumurasaki | 350/356 |
| 4,258,745 | 5/1981 | Okano | 369/44 |
| 4,285,056 | 8/1981 | Bell | 346/76 L |

OTHER PUBLICATIONS

"Diode Laser Optical Recording Using Trilayer Structures", by Bartolini et al., IEEE Journal of Quantum Electronics, vol. QE-17, No. 1, 1981, pp. 69-77.
"Media for High–Density Optical Recording", by Bartolini, Optical Engineering, May/Jun. 1981, vol. 20, No. 3, pp. 382-386.
"Archival Optical Disk Data Storage", by Ammon, Proc. Soc. Photo–Opt. Instrument Eng., vol. 222, (1980), pp. 128-135.
"Antireflection Structures for Optical Recording", by Bell et al., IEEE Journal of Quantum Electronics, vol. QE14, No. 7, Jul. 1978.
IEEE Spectrum, pp. 26-33, Aug. 1979.
IEEE Spectrum, pp. 33-38, Feb. 1979.
IEEE Spectrum, pp. 20-28, Aug. 1978.

Primary Examiner—Alan Faber
Attorney, Agent, or Firm—Nathan Cass; Kevin R. Peterson; David G. Rasumssen

[57] ABSTRACT

An optical data storage system employing a data-modulated writing laser beam and a non-erasing reading laser beam of predetermined wavelength along with an improved optical medium comprised of multiple layers whose optical characteristics and thicknesses are chosen in conjunction with the writing and reading laser beams to provide an anti-reflection condition for unrecorded portions of the medium and a relatively high reflectivity for recorded portions of the optical medium. A preferred optical medium includes a highly reflective aluminum layer, a fluorinated hydrocarbon polymer spacer layer overlaying the reflective layer, and a gold absorber layer overlaying the spacer layer.

12 Claims, 7 Drawing Figures

OPTICAL STORAGE SYSTEM EMPLOYING A MULTI-LAYER OPTICAL MEDIUM

CROSS-REFERENCE TO RELATED PATENT APPLICATION

Our concurrently filed, commonly assigned patent application, Ser. No. 368,668 filed Apr. 15, 1982 for Optical Storage System Employing a Novel Multi-Layer Optical Medium contains subject matter related to the present application.

BACKGROUND OF THE INVENTION

The present invention relates to improved means and methods for providing for the recording and reproducing of data in an optical recording and reproducing system.

In recent years considerable effort has been expended to develop improved methods and apparatus for optically recording and reading data in an optical medium because of the unusually high recording density potential offered by optical recording. In a typical system, a writing laser beam of appropriate frequency is focused upon a recording medium with sufficient intensity to cause an optically detectable change to be produced at the region of incidence of the focused spot. Data is recorded by appropriately modulating the intensity of the writing laser beam with the data to be recorded while providing for relative movement between the medium and the focused light spot, thereby producing an optically detectable data pattern in the medium. Reading of this recorded data pattern is typically accomplished using a reading laser beam of constant intensity and appropriate frequency having an intensity level which will not disturb the integrity of the recorded data. Detecting apparatus positioned to receive the reflected reading beam produces an electrical signal representative of the recorded data.

Examples of various optical memory apparatus and optical media are contained in the following patents, publications and commonly assigned copending patent applications.

U.S. PATENT DOCUMENTS

| U.S. Pat. No. | Date Issued | Inventor(s) |
| --- | --- | --- |
| 4,216,501 | 8/5/80 | Bell |
| 4,222,071 | 9/9/80 | Bell, et al. |
| 4,232,337 | 12/4/80 | Winslow, et al. |
| 4,243,848 | 1/6/81 | Utsumi |
| 4,243,850 | 1/6/82 | Edwards |
| 4,253,019 | 2/24/81 | Opheij |
| 4,253,734 | 3/3/81 | Komurasaki |
| 4,268,745 | 5/19/81 | Okano |

PUBLICATIONS

R. A. Bartolini, et al., "Optical Disk Systems Emerge", IEEE Spectrum, August 1978, pp. 20–28.

G. C. Kenney, et al., "An Optical Disk Replaces 25 Mag Tapes", IEEE Spectrum, February 1979, pp. 33–38.

K. Bulthuis, et al., "Ten Billion Bits on a Disk", IEEE Spectrum, August 1979, pp. 26–33.

A. E. Bell, et al., "Antireflection Structures for Optical Recording", IEEE Journal of Quantum Electronics, Vol. QE-14, No. 7, July 1978, pp. 487–495.

COPENDING COMMONLY ASSIGNED PATENT APPLICATIONS

Ser. No. 311,629, filed Oct. 15, 1981 for Three Beam Optical Memory System, by Robert L. Hazel and Edward V. LaBudde.

Ser. No 319,465, filed Nov. 9, 1981 for Method of Archival Data Recording and Related Media, by Edward V. LaBudde, Shiuh Chao, Neville K. Lee and Robert A. LaBudde.

Ser. No. 333,055, filed Dec. 21, 1981 for Apparatus For Preformatting an Optical Disk, by Robert L. Hazel and John E. Kammerud.

Ser. No. 349,535, filed Feb. 17, 1982 for Optical Memory System Having Improved Track Following and Seeking Capabilities, by Der-Chang Hsieh and Edward V. LaBudde.

The pertinent portions of the subject matter of the above are hereby incorporated herein.

It will be evident from the above that the choice of an optical medium is a primary consideration in the design of an optical memory system. Known optical media are deficient in various respects and the search continues for improved media. However, this search is a most difficult one and is compounded by the fact that reliable predictability is not possible because the mechanisms involved in high density laser recording in a thin film optical medium are not well understood.

SUMMARY OF THE PRESENT INVENTION

It is a broad object of the present invention to provide an optical recording and reproducing system employing an improved optical recording and reproducing medium.

A more specific object of the invention in accordance with the foregoing object is to provide improved optical recording and reproducing media using a thin film multi-layer construction employing a specially chosen spacer layer.

Another object of the invention is to provide improved optical recording and reproducing media using specially chosen spacer and absorber layers which provide an unexpectedly large improvement in recording sensitivity.

In a particular preferred embodiment of the invention, an optical recording and reproducing system of the type disclosed in the aforementioned patent application incorporates a rotating optical disk having a novel multi-layer construction comprised of a disk-shaped substrate having a highly reflective layer, a dielectric spacer layer comprised of a fluorinated hydrocarbon polymer deposited over the reflective layer, and an absorber layer of gold deposited over the spacer layer. The thicknesses and optical properties of these layers are appropriately chosen to achieve an anti-reflection condition for an incident laser beam.

The specific nature of the invention as well as other objects, advantages and features thereof will become evident from the following description taken in conjunction with the accompanying drawings.

DETAILED DESCRIPTION OF THE INVENTION

Like numerals and characters designate like elements throughout the figures of the drawings.

Figure 1:
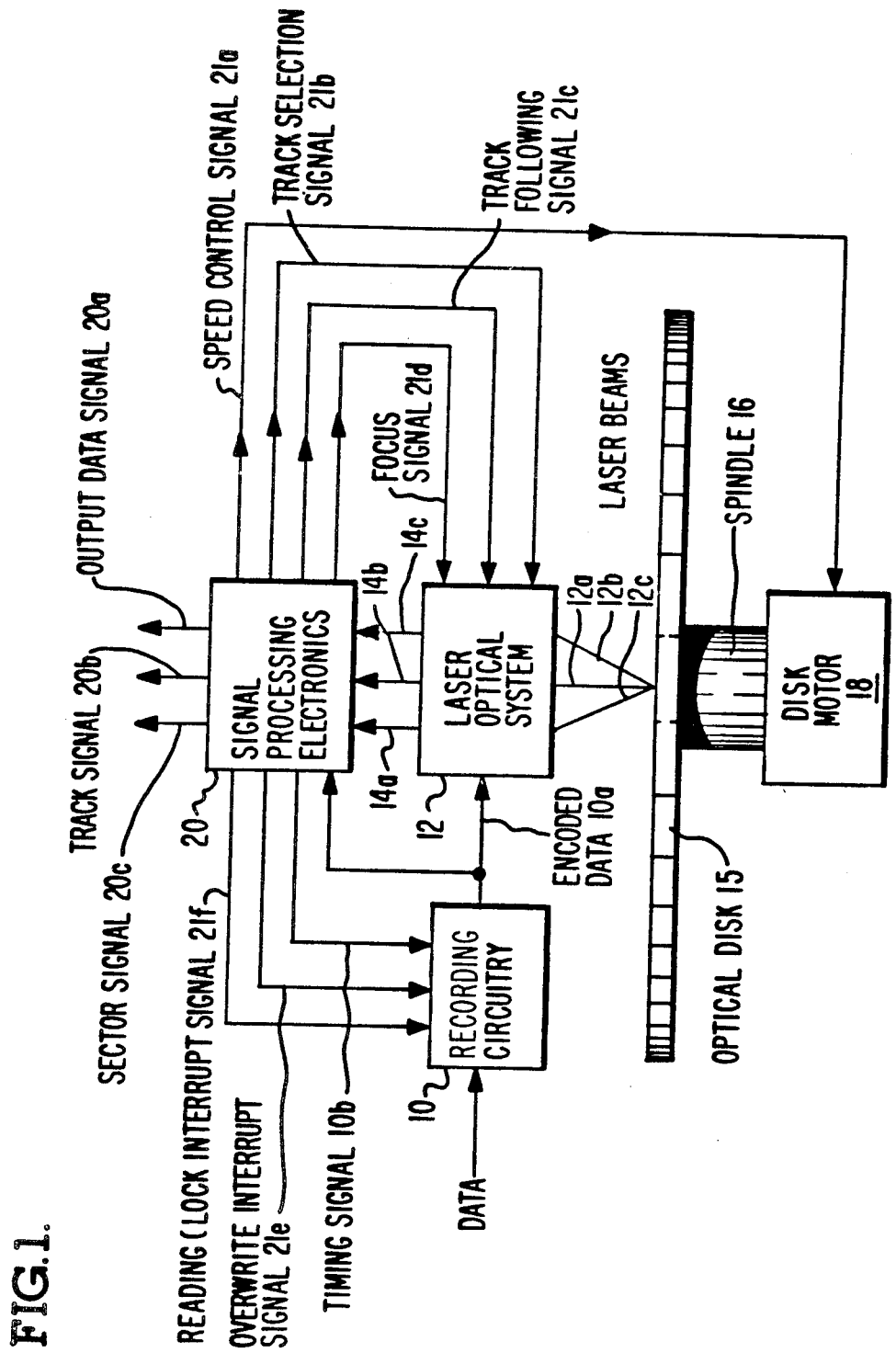
FIG. 1 is an overall block diagram of an optical recording and reproducing system incorporating the present invention.

Reference is initially directed to FIG. 1, which generally illustrates the basic portions of the preferred embodiment of an optical recording and reading system disclosed in the aforementioned commonly assigned copending patent applications. The data to be recorded is first applied to recording circuitry 10 which encodes the applied data using, for example, a conventional encoding format of the type employed for magnetic recording, such as non-return-to-zero, return-to-zero, etc. Conventional error checking may also be provided for the encoded signal.

The encoded data 10a from the recording circuitry 10 is applied to a laser optical system 12. The laser optical system 12 generates three laser beams 12a, 12b and 12c which are focused at spaced locations along the center line of the same selected track of a preformatted optical disk 15 supported on a precision spindle 16 for rotation by a motor 18.

Laser beam 12a is a writing beam which is modulated by the encoded data so as to form optically detectable changes in a selected track of the optical disk 15 representative of the encoded data. It is to be understood that the optically detectable changes produced in the disk by the write laser beam 12a need not be physical changes, such as pits or physical holes. The only requirement is that optically detectable changes be produced in selected areas of the disk in response to the write laser beam 12a which are representative of the encoded data 10a.

Laser beams 12b and 12c shown in FIG. 1 are reading beams. As typically illustrated in FIG. 2, the reading beam 12b is a read-after-write beam which is accordingly focused behind the writing beam 12a on the center line 17a of a selected track 17, while the reading beam 12b is a read-before-write beam and is accordingly focused ahead of the writing beam 12a. The intensity of the read beams 12b and 12c are chosen so that they will not disturb the integrity of previously recorded information. The read beams are reflected from the disk 15 back to the optical system 12 which, in response thereto, derives a plurality of detection signals 14a, 14b and 14c which are applied to signal processing electronics 20. The signal processing electronics 20 also receives the encoded data signal 10a from the recording circuitry 10 for use in checking the accuracy of recorded data, as will hereinafter be considered.

The signal processing electronics 20 uses the detected signals 14a, 14b and 14c to provide an output data signal 20a corresponding to data read from the optical disk 15, along with signals 20b and 20c respectively identifying the track and sector locations on the disk from which the data is read. The signal processing electronics 20 also produces control signals 10b, 21a, 21b, 21c, 21d, 21e and 21f. More specifically, control signal 10b is applied to the recording circuitry 10 for synchronizing the encoding of data with disk rotation; control signal 21a is applied to the optical disk motor 18 to provide accurate speed control during recording and reading; control signal 21b is applied to the laser optical system 12 for controlling the radial position of the laser beams 12a, 12b and 12c for the purpose of selecting a desired track; control signal 21c is applied to the laser optical system 12 for providing precise track following of the laser beams on the selected track; control signal 21d is applied to the laser optical system 12 for providing precise focusing of the laser beams 12a, 12b and 12c; and control signal 21e is applied to the recording circuitry 10 for interrupting recording if the reflected read-before-write beam indicates the possibility of an overwrite recording error because the track ahead contains previously recorded data; and signal 21f is applied to the recording circuitry 10 to interrupt recording if a recording error occurs.

Figure 3:
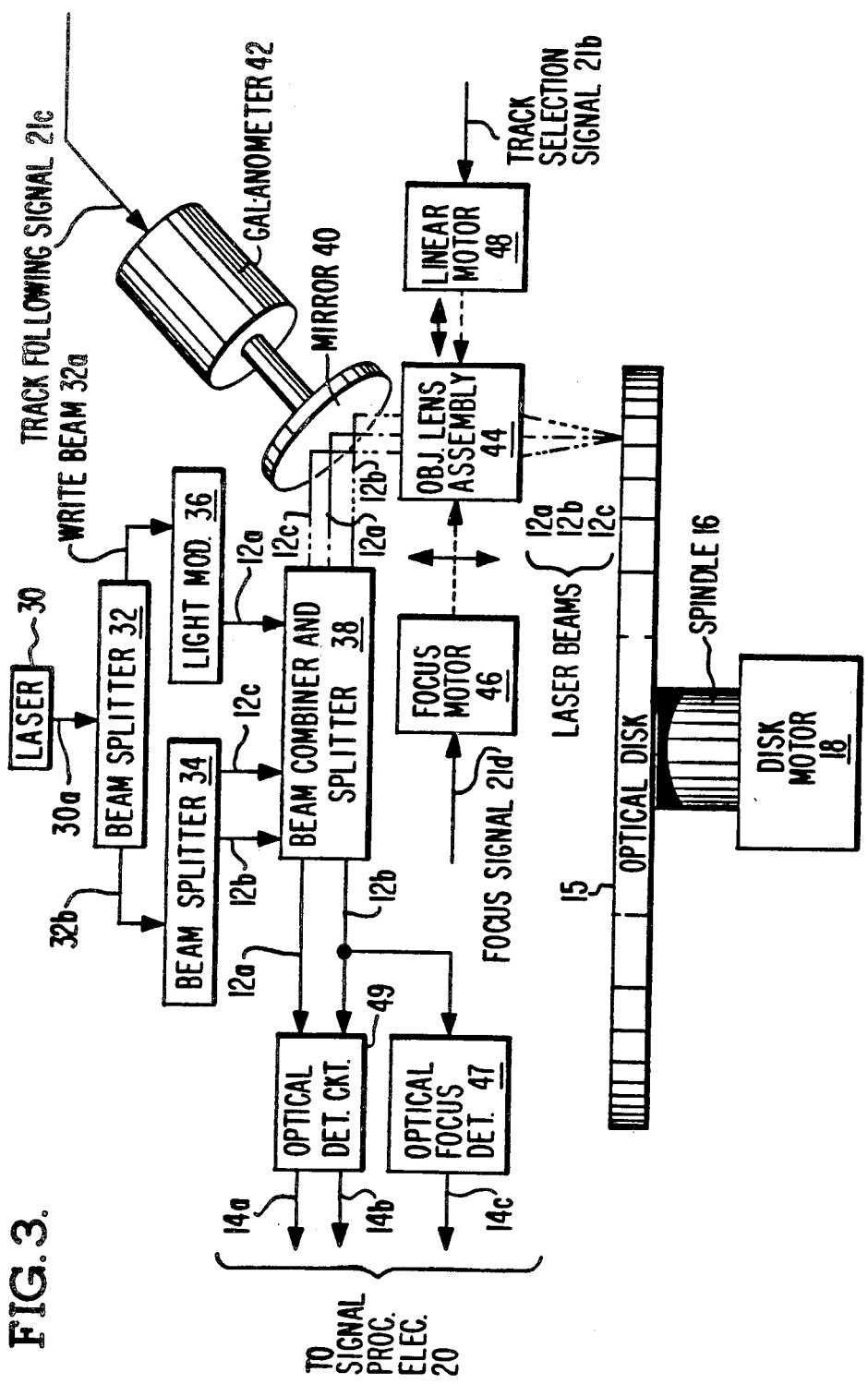
FIG. 3 is a block and schematic representation of the laser optical system shown in FIG. 1.

Reference is next directed to FIG. 3 which illustrates a preferred embodiment of the laser optical system 12 generally shown in FIG. 1. The various components of this laser optical system are illustrated in block and schematic form in FIG. 3 since their implementation can readily be provided by those skilled in the art, as will be evident from the aforementioned references.

As shown in FIG. 3, a laser 30 provides a beam 30a having a wavelength of, for example, 633 nanometers and a power level of, for example, 12 mw. This laser beam 30a is applied to a first beam splitter 32 which splits the beam into a high power beam 32a and a low power beam 32b. The low power beam 32b is applied to a second beam splitter 34 which further splits the beam 32b to provide read-after-write and read-before-write beams 12b and 12c, respectively. It is to be understood that a separate laser could be employed for providing one or more of the above beams if so desired.

The high power beam 32a in FIG. 3 is applied to a high speed light-modulator 36 which modulates the beam 32a in response to the encoded data 10a provided at the output from the recording circuitry 10 in FIG. 1. This light-modulator 36 may, for example, be an acous-to-optical digital modulator. The resulting modulated high power beam at the output of the modulator 36 is used as the write beam 12a of the system and is applied to a beam combiner and splitter 38 along with the read beams 12b and 12c which combines the beams taking into account their previously described spacing along the selected track of the disk 15 as typically illustrated in FIG. 2. The resulting three laser beams 12a, 12b and 12c are then reflected off of a mirror 40 mounted to a galvanometer 42. The galvanometer 42 is responsive to the control signal 21c from the signal processing electronics 20 (FIG. 1) so as to cause the mirror 40 to be appropriately deflected as necessary to provide for precise following along the center line of the selected track.

After reflection from the mirror 40, the laser beams 12a, 12b and 12c are then directed to an objective lens assembly 44 mounted on a focusing motor 46. The motor 46 operates in response to the control signal 21d from the signal processing electronics 20 in FIG. 1 to move the objective lens assembly 44 towards and away from the disk 15 so as to thereby maintain accurate focusing of the beams 12a, 12b and 12c on a selected track of the disk. Track selection is provided by controlling the radial position of the beams 12a, 12b and 12c relative to the disk. This is accomplished using a linear motor 48 coupled to the objective lens assembly 44 and responsive to the control signal 21b from the signal processing electronics 20 in FIG. 1.

It will be understood that the two read beams 12b and 12c shown in FIG. 3 are reflected from the disk 15 with a reflected power which is modulated in accordance with the recorded pattern over which the beams pass. The reflected read beams 12b and 12c pass back to the beam combiner and splitter 38 via the objective lens assembly 44 and the mirror 40. The beam combiner and splitter 38 directs the reflected beams to optical detection circuitry 49 which converts the beams into corresponding read-after-write and read-before-write analog electrical signals 14a and 14b which are applied to the signal processing electronics 20 as shown in FIG. 1. Also, at least one of the reflected read beams 12a and 12b is applied to a geometric optical focus detector 47 which provides a relatively low gain, wide capture range signal 14c to the signal processing electronics 20 which is indicative of the quality of focusing of the beams on the selected track.

Figure 4:
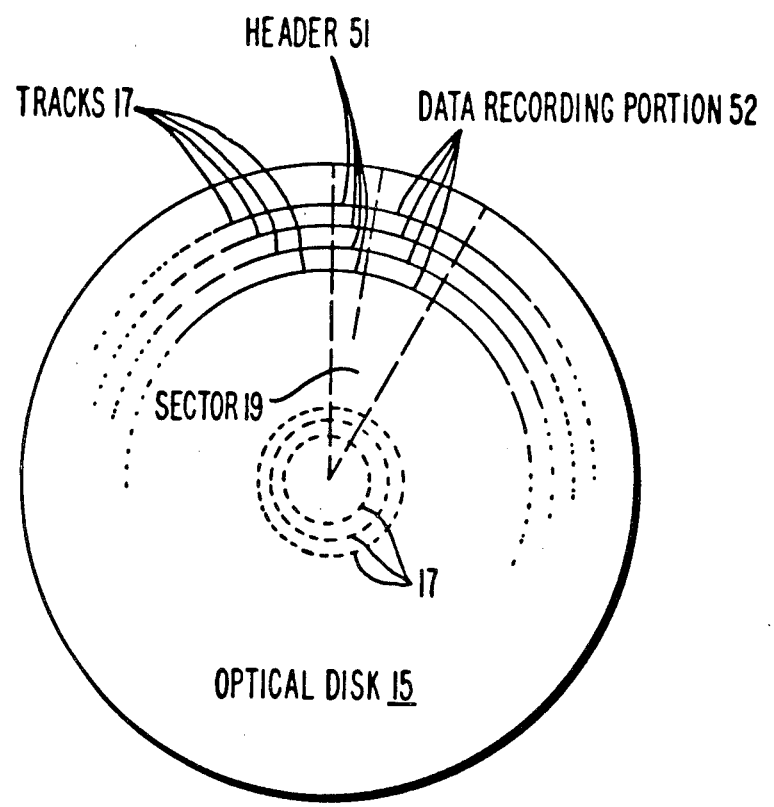
FIG. 4 is a schematic diagram generally illustrating the arrangement and formatting of data on the optical disk.

As generally indicated in FIG. 4, the optical disk 15 in the preferred embodiment being described contains a large plurality of circumferential tracks 17. The disk 15 is also divided into a plurality of sectors 19. As indicated in FIG. 4, each track 17 within a sector 19 comprises a header 51 and a data recording portion 52. The data recording portion 52 is the portion into which data is written during recording and comprises the greater portion of the track length within each sector 19. The header 51 of a track 17 is encountered first in each sector 19 and is provided on the disk prior to recording. A disk provided with such headers 51 is typically referred to as being preformatted. These headers 51 contain recorded data which are used for deriving timing, track address, track following and focusing signals for the system, as described in detail in the aforementioned copending patent applications.

Figure 5:
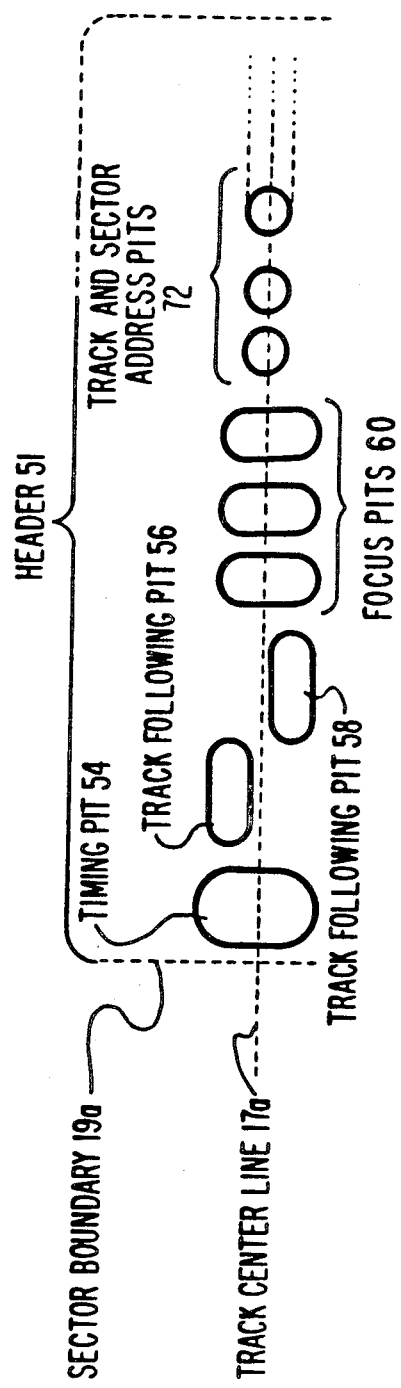
FIG. 5 is a schematic diagram of a specific exemplary header which may be employed for the header generally shown in FIG. 4.

FIG. 5 illustrates an example of a preformatted header 51 which is provided for each track 17 in each sector 19 of the disk 15 of FIG. 3. Although the optically detectable changes constituting the header 51 may take various forms, it will be assumed for the purposes of this description that physical holes, such as pits, are employed for the exemplary header shown in FIG. 4. It will also be assumed that a pit exhibits a relatively high reflectance to an incident beam while other undisturbed disk areas exhibit a relatively low reflectance. It is to be understood that an arrangement may also be employed in which a portion of the optical recording is provided using physical holes, such as pits, and the remaining recorded portions are recorded using another type of optically detectable change.

As shown in FIG. 5, immediately following the left sector boundary 19a is a relatively large pit 54 providing a relatively large change in optical reflectance which is used to provide synchronized timing for the signal processing electronics 20 in FIG. 1. Following pit 54 are two pits 56 and 58 elongated in a direction parallel to the track 17 and disposed on opposite sides of the track center line 17a in a staggered relationship. These pits 56 and 58 are used by the signal processing electronics 20 in FIG. 1 to provide precise track following.

Following the elongated pits 56 and 58 in the exemplary header 51 shown in FIG. 5 are a plurality of pits 60 elongated perpendicularly to the track center line 17a. The locations and dimensions of the pits 60 are chosen so that the reflected signal obtained upon traversing these pits 60 will have a value dependent upon the quality of focusing of the incident beam.

The focusing pits 60 are followed by address pits 72 recorded so as to provide an identification of the particular track and sector being traversed by the laser beams. In other words, the pits 72 represent a track and sector address which can be provided using conventional encoding techniques, such as for example is used for identifying tracks and sectors on magnetic disks. In the particular example illustrated in FIG. 5, these pits 72 which provide track and sector address identification are the last portion of the header 51, the remaining portion of the track in the sector 19 thereby being available for recording data.

As pointed out previously, the resulting disk containing these headers is considered to be preformatted. Such preformatted disks will typically be provided to users who will make use of the preformatted headers in conjunction with signal processing electronics 20, such as illustrated in FIG. 1, for recording and reading data in the data recording portion 52 of each track 17 in each sector 19.

Having thus described the optical recording and reproducing system disclosed in the aforementioned commonly assigned copending applications, a preferred construction for the optical disk 15 in FIGS. 1 and 2 in accordance with the invention will next be described with reference to FIG. 6. It is, of course, to be understood that the present invention may also be used for other types of systems.

Figure 6:
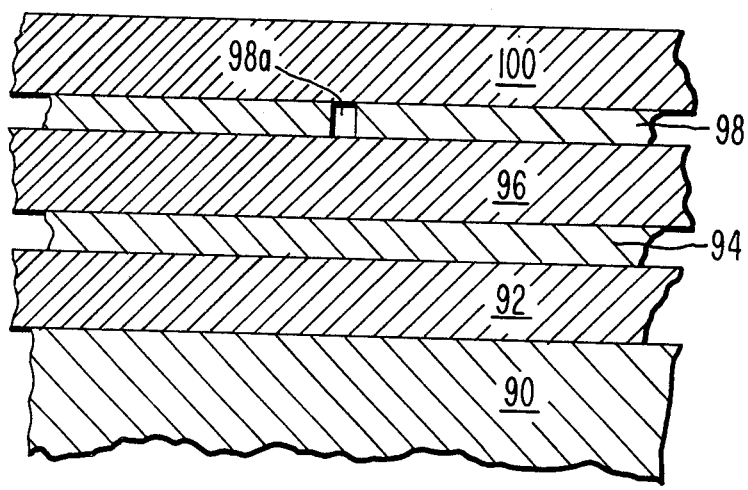
FIG. 6 is a cross-sectional view illustrating the construction of an optical disk in accordance with the invention.

Accordingly, referring now to FIG. 6, illustrated therein is a cross-section of a multi-layer optical disk construction which may be employed for the optical disk 15 in the system of FIGS. 1–5. A supporting substrate 90 of glass, plastic or aluminum is provided with an organic smoothing layer 92 of, for example, 20–60 microns prior to deposition thereon of an opaque, highly reflective layer 94 which may, for example, have a thickness of 400–1800 Angstroms. This reflective layer 94 can be made by evaporating aluminum until the layer is just opaque when a bright light is viewed through it. If a sufficiently smooth substrate 90 is used, such as polished glass, the smoothing layer 92 may be omitted.

A dielectric spacer layer 96 which is transparent at the laser wavelength is deposited over the aluminum reflector layer 94. In the prior art, this dielectric spacer layer 96 is normally in the range of 0.5 to 1.5 quarter-waves of the frequency of the recording laser beam and may typically comprise a 500–1200 Angstroms layer of silicon dioxide. In accordance with the present invention, this spacer layer 96 is advantageously chosen from the class of materials known as fluorinated hydrocarbon polymers, as will be considered in detail further on herein.

Over the spacer layer 96 in FIG. 6 is deposited an absorber layer 98 which is light absorptive at the laser wavelength. This absorber layer 98 may typically be a 20 to 300 Anstroms layer of tellurium. In accordance with another important feature of the invention, it has additionally been discovered that significantly greater recording sensitivity can be realized by choosing gold for the absorber layer 98 which is provided over the fluorinated hydrocarbon polymer spacer layer 96. An example of an optically detectable change produced in the absorber layer 98 by an incident writing laser beam is illustrated in FIG. 6 by the pit or deformation 98a shown in FIG. 6. Finally, the absorber layer 98 in FIG. 6 is overcoated with a suitable protective layer 100.

An anti-reflection (dark mirror) condition for a laser beam of predetermined frequency incident on unrecorded portions of the optical medium illustrated in FIG. 6 is produced by appropriately choosing the thicknesses and optical characteristics of the various layers in a manner well known in the art.

Figure 2:
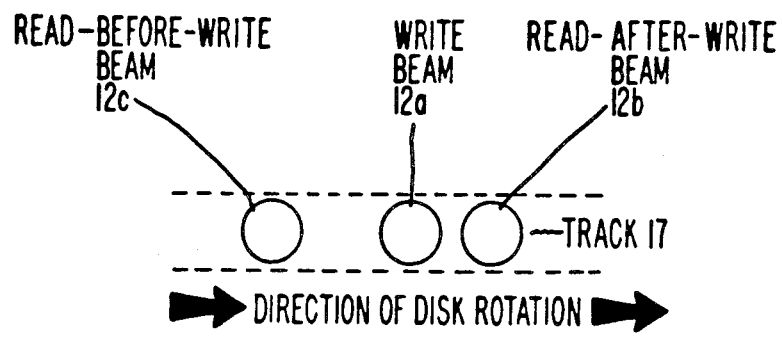
FIG. 2 illustrates the relative locations of the three laser beams provided by the system of FIG. 1 when focused on a selected track of an optical disk.

Recording on a disk 15 such as illustrated in FIG. 6 is accomplished by employing an appropriately focused, intensity-modulated writing laser beam, such as laser beam 12a in FIGS. 1 and 2. This writing laser beam records information by forming an optically detectable change (such as illustrated at 98a in FIG. 6) in the absorbing layer 98 which disturbs the anti-reflection condition. The spacing and dimensions of these optically detectable changes are representative of the recorded data. Information is read from the disk 15 using an appropriately focused reading laser beam such as laser beams 12b and 12c in FIGS. 1 and 2. The wavelength of this reading laser beam is chosen so that unrecorded regions of the disk 15 exhibit the previously mentioned anti-reflection condition. The reading laser beam is also chosen to have an intensity which does not disturb the integrity of data recorded on the disk.

It will thus be understood that the reflected reading beam will be intensity modulated by the recorded optically detectable changes, since the reading beam will experience a relatively high reflection when the beam is incident on a recorded region, and a relatively low reflection when the reading beam is incident on an unwritten region. The protective layer 100 is chosen so that dust particles on its upper surface will be far removed from the focal plane of the optical system (that is, they will be out of focus) so as to have a negligible effect on the above described recording and reading operations.

It has been found that, in order for the laser beam to produce an optically detectable disturbance in the reflectivity of the thin film absorber layer 98 in FIG. 6, a minimum temperature must be reached by the absorber film. The value of this minimum temperature has been found to be dependent not only on the properties of the thin film absorber layer 98, but also on its thickness and microscopic structure, and additionally on the properties of the spacer layer 96 and the interface characteristics between the spacer layer 96 and the absorber layer 98.

It has also been found that a finite time period is required for the region of the thin film absorber material 98 on which the writing laser beam is incident to reach the required minimum temperature. While this absorber film region is being heated, heat is being lost as a result of heat flow to the underlying dielectric spacer layer 96. The more heat that is lost, the more time and heat that are required for recording, thereby reducing the recording sensitivity. It has also been found that heat flow loss can reduce the quality of the recording and thereby affect the recording density capability of the medium.

In accordance with the present invention, it has been discovered that a material chosen from the class of materials known as fluorinated hydrocarbon polymers can advantageously be used for the dielectric spacer layer 96 in FIG. 1, and, most importantly, that use of such a material for the spacer layer 96 significantly reduces the heat loss flow from the absorber film region being heated by the writing laser beam. A particular preferred hydrocarbon is polytetrafluoroethylene, a commercial product available under the name "Teflon", a trademark of Dupont. These fluorinated hydrocarbon polymers can be successfully deposited over the reflective layer 14 in FIG. 1 in thin uniform layers by evaporation from a melt in a vacuum, by glow discharge on the solid, or by plasma polymerization of the monomer vapor.

It has additionally been discovered that the use of a gold absorber layer over the fluorinated hydrocarbon polymer spacer layer provides an unexpectedly large improvement in the recording sensitivity, while maintaining a good signal-to-noise ratio. This gold absorber layer is deposited, for example, by evaporation and preferably has a thickness in the range of 20-80 Angstroms, although thicknesses as great as 150 Angstroms can be used.

Following are examples of a number of preferred constructions for a multi-layer optical medium in accordance with the invention.

EXAMPLE I

Figure 7:
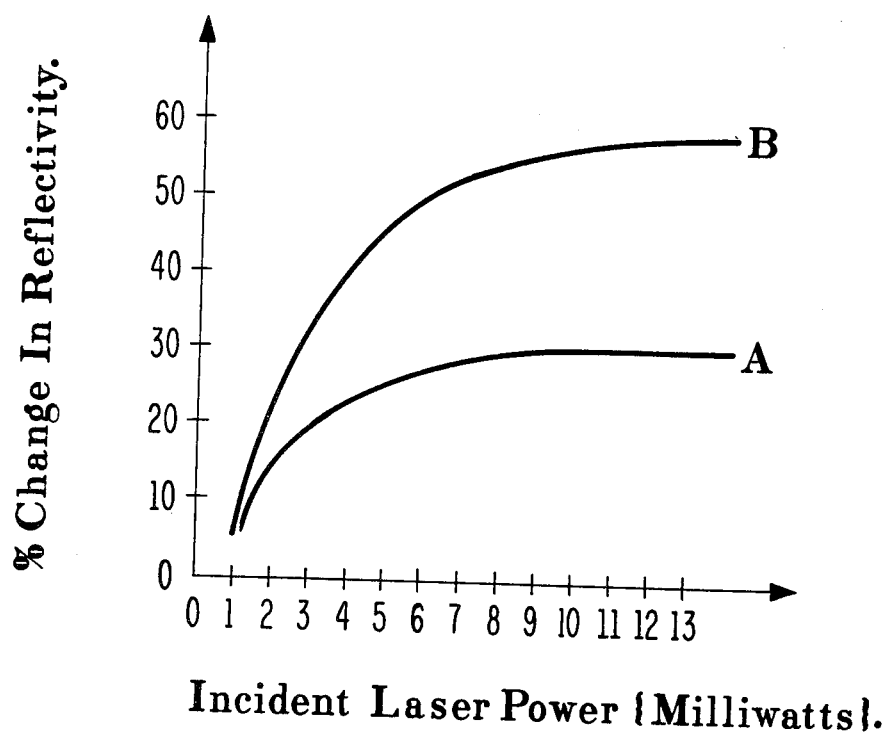
FIG. 7 illustrates curves showing the percent change of reflectivity vs. incident laser power in milliwatts for a plurality of exemplary optical disk constructions.

A structure was constructed comprising a polished glass substrate, an aluminum reflective layer of approximately 1500 Angstroms, a polytetrafluoroethylene spacer layer of approximately 950 Angstroms, and a tellurium absorber layer of approximately 63 Angstroms. The polytetrafluoroethylene spacer layer was deposited by plasma polymerization and the other layers were deposited by evaporation. Laser recordings were made on the resulting optical medium at 2400 revolutions per minute using apparatus of the general type illustrated in FIGS. 1 and 3. A Helium-Neon laser was used for recording which provided a laser beam having a wavelength of 632.8 nanometers. The focused laser beam spot on the medium was approximately 0.5 micron. Results obtained from the testing of the sensitivity of the recordings formed in an optical medium constructed in accordance with this example are shown in Curve A in FIG. 7.

EXAMPLE II

A structure was constructed comprising a polished glass substrate, an aluminum reflective layer of approximately 600 Angstroms, a polytetrafluoroethylene spacer layer of approximately 950 Angstroms, a pure gold absorber layer of approximately 50 Angstroms and a silicon oxide protective layer of approximately 1500 Angstroms. Laser recordings were made on the resulting optical medium at 2400 revolutions per minute using apparatus of the general type illustrated in FIGS. 1 and 3. A Helium-Neon laser was used for recording which provided a laser beam having a wavelength of 632.8 nanometers. The focused laser beam spot on the medium was approximately 0.5 micron. Results obtained from the testing of the sensitivity of the recordings formed in an optical medium constructed in accordance with this example are shown in Curve B in FIG. 7.

Although the present invention has been described in connection with a particular preferred embodiment it is to be understood that the invention is subject to many modifications and variations in construction, arrangement and use without departing from the true scope of the invention. Accordingly, the present invention is to be considered as encompassing all possible modifications and variations coming within the scope of the appended claims.

What is claimed is:

1. A method of making an optical storage medium for use in an optical storage system providing a data-modulated laser beam of predetermined wavelength which is capable of being focused upon said medium while relative movement is provided therebetween, said method including the steps of:

providing a reflective layer;

depositing a fluorinated hydrocarbon polymer spacer layer over said reflective layer; and depositing a gold absorber layer of 150 Angstroms or less over said spacer layer;

the thicknesses and optical characteristics of said layers being chosen so that at the wavelength of said laser beam an anti-reflection condition is produced for unrecorded portions of said medium;

the thicknesses and optical characteristics of said layers also being chosen so that an intensity-modulated laser beam is able to form optically detectable changes at selected regions of said absorber layer by heating each such region so as to disturb the anti-reflection condition thereat;

said fluorinated hydrocarbon polymer spacer layer acting to reduce heat loss from the absorber layer during the formation of an optically detectable change.

2. The invention in accordance with claim 1, wherein said fluorinated hydrocarbon polymer spacer layer is deposited by plasma polymerization of a monomer vapor of the fluorinated hydrocarbon polymer.

3. The invention in accordance with claim 1, wherein said fluorinated hydrocarbon polymer spacer layer is deposited by evaporation from a melt in a vacuum.

4. The invention in accordance with claim 1, wherein said fluorinated hydrocarbon polymer spacer layer is deposited by glow discharge on the reflective layer.

5. In an optical storage system, the combination comprising:

an optical recording medium;

means for providing a recording laser beam having a predetermined wavelength;

means for modulating said recording beam in accordance with applied data;

means for focusing the modulated beam upon said recording medium; and means providing for relative movement between the focused recording laser beam and said recording medium;

said recording medium comprising a plurality of layers including a reflective layer, a fluorinated hydrocarbon polymer spacer layer overlaying said reflective layer, and a gold absorber layer of 150 Angstroms or less overlaying said fluorinated hydrocarbon polymer spacer layer, the thicknesses and optical characteristics of said layers being chosen so that unrecorded regions of said medium exhibit an anti-reflection condition at said predetermined wavelength, said medium being adapted so that during relative movement between the modulated focused laser beam and said medium optically detectable changes are produced in said absorbing layer which disturb said anti-reflective condition at predetermined regions of said medium in a manner representative of applied data, said fluorinated hydrocarbon polymer spacer layer acting to reduce heat loss from the absorber layer during the production of an optically detectable change by said recording laser beam.

6. The invention in accordance with claim 5, including means for providing a reading laser beam having a predetermined wavelength and wherein said means for focusing and said means providing for relative movement are also employed for focusing said reading laser beam upon said medium and for providing relative movement therebetween, the intensity and wavelength of said reading laser beam being chosen so that during relative movement between the focused reading laser beam and said medium the reflected reading laser beam from said medium varies in accordance with the optically detectable changes in said absorber layer traversed by said reading means, the intensity of said reading laser beam additionally being chosen so that it does not significantly affect the subsequent readability of said optically detectable changes.

7. In an optical storage system, the combination comprising:

an optical medium having data recorded thereon;

means for providing a reading laser beam having a predetermined wavelength;

means for focusing said reading laser beam on said medium; and means providing for relative movement between the focused reading laser beam and said medium;

said medium comprising a plurality of layers including a reflective layer, a fluorinated hydrocarbon polymer spacer layer overlaying said reflective layer, and a gold absorber layer of 150 Angstroms or less overlaying said fluorinated hydrocarbon polymer spacer layer, the thicknesses and optical characteristics of said layers being chosen so that unrecorded regions of said medium exhibit an anti-reflection condition at said predetermined wavelength, said medium having data recorded thereon in the form of disturbances of said anti-reflective condition caused by the presence of optically detectable changes in said absorbing layer, said reading laser beam being chosen so that during relative movement between the focused reading laser beam and said medium the reflected reading laser beam from said medium varies in accordance with the optically detectable changes in said absorber layer traversed thereby, the intensity of said reading laser beam additionally being chosen so that it does not significantly affect the subsequent readability of said optically detectable changes.

8. An optical medium for use in an optical storage system capable of providing a data-modulated focused recording laser beam of predetermined wavelength on said medium while providing relative movement therebetween, said medium comprising a plurality of layers including a reflective layer, a fluorinated hydrocarbon polymer spacer layer overlaying said reflective layer, and a gold absorber layer of 150 Angstroms or less overlaying said fluorinated hydrocarbon polymer spacer layer, the thicknesses and optical characteristics of said layers being chosen so that unrecorded regions of said medium exhibit an anti-reflection condition at said predetermined wavelength, said medium being adapted for recording such that during relative movement between the modulated focused laser beam and said medium optically detectable changes are produced in said absorbing layer which disturb said anti-reflective condition at predetermined regions of said medium in a manner representative of applied data, said fluorinated hydrocarbon polymer space layer acting to reduce heat loss from the absorber layer during the production of an optically detectable change by said recording laser beam.

9. An optical medium for use in an optical storage system capable of providing a focused reading laser beam of predetermined wavelength on said medium while providing relative movement therebetween, said medium comprising a plurality of layers including a reflective layer, a fluorinated hydrocarbon polymer spacer layer overlaying said reflective layer, and a gold absorber layer of 150 Angstroms or less overlaying said fluorinated hydrocarbon polymer spacer layer, the thicknesses and optical characteristics of said layers being chosen so that unrecorded regions of said medium exhibit an anti-reflection condition at said predetermined wavelength, said medium having data recorded thereon in the form of disturbances of said anti-reflective condition caused by the presence of optically detectable changes in said absorbing layer.

10. The invention in accordance with claim 1, 2, 3, 4, 5, 6, 7, 8 or 9, wherein the gold absorber layer is in the range of 20–80 Angstroms.

11. The invention in accordance with claim 1, 2, 3, 4, 5, 6, 7, 8 or 9, wherein said fluorinated hydrocarbon polymer layer is polytetrafluoroethylene.

12. The invention in accordance with claim 11, wherein the gold absorber layer is in the range of 20–80 Angstroms.

* * * * *